United States Patent
Junkins et al.

(10) Patent No.: US 6,567,082 B1
(45) Date of Patent: May 20, 2003

(54) INCREMENTAL RESOLUTION CHANGES IN MULTI-RESOLUTION MESHES WITH UPDATE RECORDS

(75) Inventors: Stephen Junkins, Portland, OR (US); Mike B. MacPherson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/379,164

(22) Filed: Aug. 23, 1999

(51) Int. Cl.[7] .............................................. G06T 15/30
(52) U.S. Cl. ...................................................... 345/423
(58) Field of Search ................................ 345/423, 419, 345/420, 440, 418, 441

(56) References Cited

U.S. PATENT DOCUMENTS

| | | | | |
|---|---|---|---|---|
| 5,886,702 A | * | 3/1999 | Migdal et al. ............... | 345/423 |
| 5,929,860 A | * | 7/1999 | Hoppe ......................... | 345/419 |
| 5,966,133 A | * | 10/1999 | Hoppe ......................... | 345/420 |
| 6,031,548 A | * | 2/2000 | Gueziec et al. .............. | 345/440 |
| 6,046,744 A | * | 4/2000 | Hoppe ......................... | 345/419 |
| 6,075,540 A | * | 6/2000 | Hoppe ......................... | 345/419 |
| 6,262,737 B1 | * | 7/2001 | Li et al. ....................... | 345/419 |
| 6,262,739 B1 | * | 7/2001 | Migdal et al. ............... | 345/423 |

OTHER PUBLICATIONS

Hoppe, H., "Progressive Meshes", *Microsoft Research, Computer Graphics, SIGGRAPH Proceedings*, http://www.research.microsoft.com/research/graphics/hoppe/, 10 p., (1996).

* cited by examiner

*Primary Examiner*—Cliff N. Vo
*Assistant Examiner*—Huedung X. Cao
(74) *Attorney, Agent, or Firm*—Schwegman, Lundberg, Woessner & Kluth, P.A.

(57) ABSTRACT

A method of producing a multi-resolution mesh is provided. A vertex array and a face array are constructed, wherein the vertex records and face records are ordered in the respective arrays by resolution. These arrays therefore comprise ordered vertices and faces to be added or removed for each incremental change in resolution. A vertex update record associated with each vertex contains face update records which specify what existing faces must be updated when adding or removing the vertex, and contains a new faces record indicating the number of faces from the face array to be added to or deleted from the mesh when adding or removing the vertex.

17 Claims, 3 Drawing Sheets

| VERTEX UPDATE RECORD | |
|---|---|
| VERTEX INDEX | 4 | ~301
| NEW FACES | 2 | ~302
| FACE UPDATES | 1 | ~303
| FACE UPDATE RECORD | 1 | ~310
| FACE NUMBER | 3 | ~311
| VERTEX ATTRIBUTE | A | ~312
| VALUE [0] | 1 | ~313
| VALUE [1] | 4 | ~314

| FACE 4 | | ~320 |
|---|---|---|
| A | 4 | ~321 |
| B | 3 | ~322 |
| C | 1 | ~323 |

| FACE 5 | | ~330 |
|---|---|---|
| A | 4 | |
| B | 2 | |
| C | 1 | |

FIG. 3

| FACE 3 | 401 | |
|---|---|---|
| A | 4 | ~402 |
| B | 2 | ~403 |
| C | 3 | ~404 |

FIG. 4

INCREMENTAL RESOLUTION CHANGES IN MULTI-RESOLUTION MESHES WITH UPDATE RECORDS

FIELD OF THE INVENTION

The invention relates generally to computer graphics, and more specifically to multi-resolution three-dimensional meshes.

BACKGROUND OF THE INVENTION

Rendering of three-dimensional objects on a computer screen is a process that typically involves defining the object to be rendered in detail, creation of a mesh that models the visible surfaces of the object, and rendering and shading of the mesh. Such a mesh typically comprises a number of interconnected triangles defined by a number of vertices in three-dimensional space. Very detailed geometric models have become common in defining three-dimensional objects to be rendered as meshes, and require a very large number of vertices and faces in a mesh to produce a realistic rendering. Applications ranging from advanced CAD/CAM and graphics to computer games increasingly require greater levels of realism and detail in the objects rendered, and so require efficient processing and display of three dimensional meshes.

Detailed three-dimensional objects are often rendered as a mesh of polygons, such as a triangle mesh, that is produced and sent to a rendering pipeline to be rendered as a visible image on a monitor. The meshes produced as a result of 3-D modeling operations are often relatively large and processor-intensive to render, and so multiple meshes that represent the same three-dimensional object may be produced containing different levels of detail and used at various times depending on the desired object resolution. An object that appears very small when rendered to a monitor may need relatively few defining triangles to be realistically rendered by a triangle mesh, while the same object viewed more closely or rendered larger in size will require substantially more triangles to render a realistic image.

Such an object must be represented by a detailed mesh if it is to be viewed closely or rendered large in size, but processing all the detailed mesh information for such an object when rendered as a very small or distant object unnecessarily uses valuable rendering processor time. In such a case, a greatly simplified mesh could be rendered to produce as realistic an image as would be rendered with the detailed mesh definition, and would require substantially less computation to render. But, efficient generation of an appropriately detailed mesh for the desired rendered object resolution and level of detail is not a trivial task.

A three-dimensional model can simply be reprocessed to derive a new mesh of appropriate resolution and detail once the optimal mesh resolution is known, but this requires substantial processing at the time of rendering. Several meshes of varying resolutions can be produced and stored before rendering of images employing the modeled object, but storage of meshes of several resolutions consumes valuable storage space. Generation and storage of multiple meshes also will likely not produce a mesh of optimal resolution for a specific size rendering of the object, requiring either loss of detail in rendering a smaller mesh or unneeded processing in rendering a more detailed mesh. Furthermore, switching between meshes of substantially different resolution can produce visual artifacts when rendered, such as what is known in the art as model popping.

Various methods, including optimizing meshes for rendering efficiency and compression of meshes have been developed, but fail to provide an efficient means for providing a mesh of arbitrary resolution or detail for rendering. A better method is therefore needed of producing a mesh of an arbitrary resolution, in a manner that is efficient both in the amount of processing required and in storage space needed.

SUMMARY OF THE INVENTION

A method of incrementally varying the resolution of a multi-resolution mesh with a plurality of vertices and faces is provided. A vertex is added to the mesh if the resolution is incrementally increasing, and a vertex is deleted from the mesh if the resolution is incrementally decreasing. Faces of the mesh are updated if needed. Faces are added to the mesh if needed when a vertex is added, and faces are deleted from the mesh if needed when a vertex is deleted.

BRIEF DESCRIPTION OF THE FIGURES

FIG. 3 shows a vertex update record, consistent with an embodiment of the present invention.

FIG. 4 shows a face record from a face array, consistent with an embodiment of the present invention.

DETAILED DESCRIPTION

Figure 1:
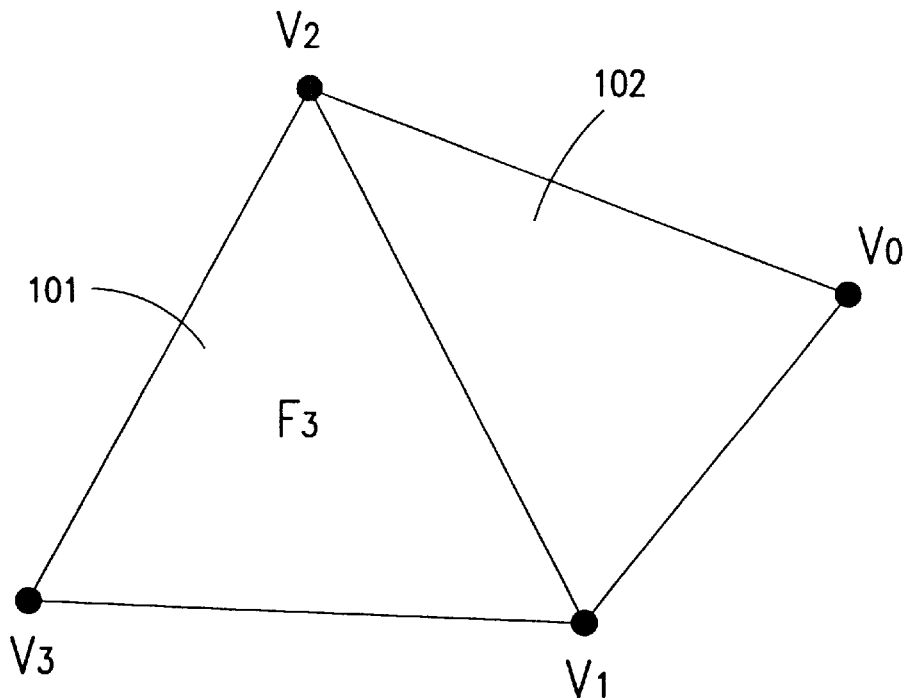
FIG. 1 shows a four-vertex mesh such as may be produced by an embodiment of the present invention.

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

A method is needed for reducing the processing and storage requirements that are currently a part of producing multi-resolution meshes for efficient rendering of detailed three-dimensional objects. The present invention improves on providing multiple meshes or computationally intensive real-time derivation of a mesh of a particular resolution by providing a single mesh with vertex update records such that the mesh can be efficiently rendered at any desired resolution.

The present invention models a three-dimensional object using a multi-resolution mesh that comprises preordered vertex and face arrays, and a vertex update record associated with each vertex of the vertex array. The vertices are pre-ordered in order of increasing resolution, such that rendering at any resolution simply requires rendering only those vertices up to a known point in the vertex array. Similarly, a face array lists all faces of the mesh in order of increasing resolution, and so may be provided in order to the rendering pipeline. The face array records are then provided from the first record through whatever record is the last face record associated with the last vertex supplied to render the object at the desired resolution.

Resolution of a mesh is increased incrementally by addition of a new vertex to the existing mesh, which comprises processing of the vertex update record associated with the added vertex. Addition of a vertex may also require addition or modification of faces rendered in the mesh, as specified in the associated vertex update record. These altered faces are indicated in the vertex update record by face update records that are associated with new vertices in the vertex array as necessary. For example, in a mesh of triangles, each face update record lists the face to be altered, which of the three vertices of the face is to be altered, and which vertex of the mesh the altered face vertex is to be replaced with depending on whether the vertex of the vertex array is being added or removed. The same method may be employed in meshes comprised of other polygons, which simply have more vertices per face to record.

The vertex update record as described not only can provide a mesh of any desired resolution by preparing vertex and face data stored in a portion of ordered face and vertex arrays, but has other benefits not present in alternate methods of defining multi-resolution meshes. The vertex update record and face and vertex arrays of the present invention work very efficiently with a cache, as the stored data is ordered based on the order of use in incrementally increasing or decreasing the mesh resolution. Further, the vertex and face arrays comprise a common mesh representation that is currently widely employed by graphics hardware and software, and so is compatible with existing rendering methods. The vertex update record is also efficient in the way it encodes both a mesh and incremental resolution changes, and so conserves both storage and memory.

To implement a multi-resolution mesh as described above, a data structure may be defined that contains or references the data of the vertex array, the face array, the vertex update records, and the face update records. The vertex array is ordered in order of increasing resolution, and vertex update records are associated with each vertex in the vertex array. The vertex update records comprise data associated with ordered vertices that is processed in incorporating a new vertex into the mesh, such as new face and face update information. One example of a vertex update record data structure that defines a mesh of triangles and a method of rendering a mesh using such a structure is described below, and is consistent with an embodiment of the present invention.

Figure 2:
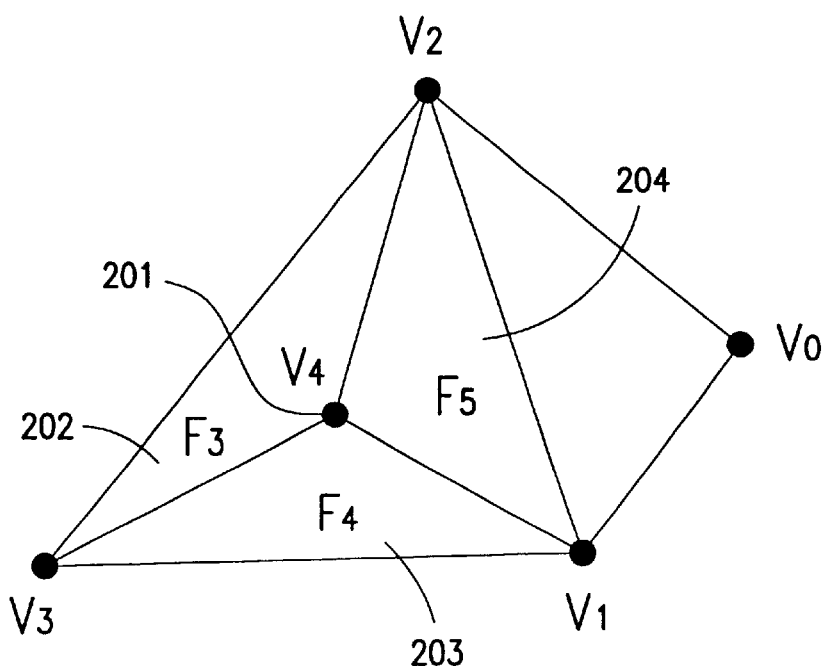
FIG. 2 shows a five-vertex mesh such as may be produced by an embodiment of the present invention.

As an example, a vertex is to be added to the four vertex mesh of FIG. 1. The original mesh has four vertices numbered V0–V3, and four faces, two of which are visible at 101 and 102 in FIG. 1. In this example, a new vertex will be added to the mesh to increase apparent resolution. The added vertex will be positioned close to face 3, the face shown at 101 in the diagram. FIG. 2 shows the new, higher resolution mesh, with Vertex V4 shown at 201 added to the mesh. In adding the new vertex, face 3 of FIG. 1 was updated as shown at 202 in FIG. 2, and faces 4 and 5 were added as shown at 203 and 204, respectively. The transformation of the four vertex mesh of FIG. 1 to the five vertex mesh of FIG. 2 is defined in this example by a vertex update record, as shown in FIG. 3.

The vertex update record is a data structure containing information necessary to define the new faces and face changes associated with each vertex addition or deletion. In our example, the vertex update record starts with the vertex index data shown at 301, which represents the vertex number of the vertex being added to or deleted from the mesh. The update record also indicates the number of new faces in a new faces record at 302, and the number of faces that will be updated in a face updates record at 303. Because one face is indicated as requiring an update at 303 in our example, there is one face update record associated with this vertex update record that provides details of the face change. For each vertex update record, any number of faces may need updating to create the new mesh. Here, the single face update record is identified as face update record 1 at 310.

The face update record associated with the vertex update record of FIG. 3 also includes the face number of the face record from the face array that is to be changed, shown at 311. Next at 312, the vertex attribute record contains information indicating which vertex of the face being updated is to be changed. Finally, value [0] at 313 indicates the vertex number the face vertex indicated at 312 is to be assigned when resolution is decreasing, and value [1] at 314 indicates the vertex number to which the face vertex identified at 312 is to be assigned when resolution is increasing.

Referring back to FIG. 2, we can see that the vertex 4 indicated as the vertex to be added or deleted at 301 is added to the mesh of FIG. 2 at 201. The next two faces of the face array have also been added as indicated by the new faces record at 302, and are shown as face F4 at 203 and face F5 at 204. The single face update indicated at 303 and identified as being face 3 in the face update record at 311 is shown in FIG. 2 at 202. The vertex attribute A shown at 312 indicates that vertex A of face 3 is to be altered, and the value [1] data at 314 indicates that when resolution is increasing as it is in this example, vertex attribute A of face 3 is to be changed from its previous vertex number to vertex 4.

Figure 5:
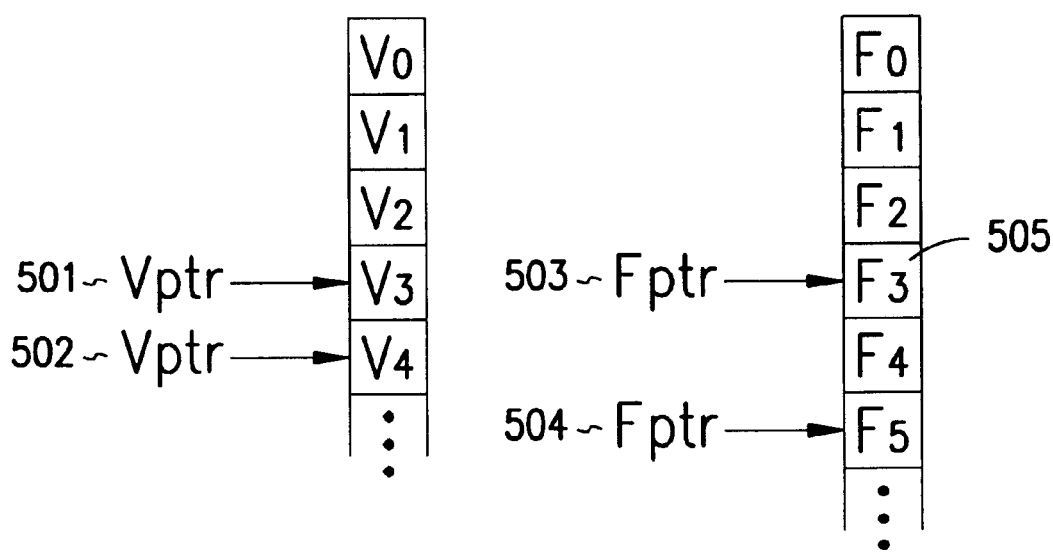
FIG. 5 shows a vertex array of vertex records and a face array of face records, consistent with an embodiment of the present invention.

To understand how the vertex attribute A is recorded and used, refer to the vertex array and face array of FIG. 5. V0 represents a data record containing vertex data defining the vertex with vertex number zero, and F0 represents a face record containing the data associated with face attributes A, B, and C. These face attributes record the vertex numbers associated with each of the three vertices of a triangular face in a triangle mesh.

A simple three-vertex mesh with only one triangular face defined by the three vertices would have each of the three vertices as either the A, B, or C attribute of the face. Addition of a fourth vertex to the three vertex mesh results in a more complex mesh as shown in FIG. 2, with four faces. As the number of faces increase, additional face array records are created to record the numbers of the vertices that define the corners of the added faces. In adding a single vertex to a three-vertex mesh, three new faces are needed to complete the mesh that is shown in FIG. 1. Therefore, the number of faces in a specific mesh is not necessarily the same as the number of vertices in the mesh, and the vertex update record must update vertex array and face array pointers that indicate not only whether a vertex array record is to be added or removed from the mesh, but also the number of face records to be added or removed in updating the mesh. Because multiple faces may be added or changed with the addition or deletion of a single vertex of the mesh, face records from the face array that are used in updating the mesh for a single vertex need not be in any particular order relative to each other, but must be listed in order of increasing resolution relative to face records added or deleted with the addition or deletion of other vertices.

FIG. 3 shows face records for face 4 and face 5 at 320 and 330. The face attribute data of face 4 includes attribute A, shown to be vertex 4 at 321, attribute B which is shown to be vertex 3 at 322, and attribute C, which contains data indicating vertex 1. Inspection of the face 4 face record in FIG. 3 indicates that face 4 is in fact a face defined by vertices 4, 3, and 1.

Face record 4, as shown at 320, and face record 5, as shown at 330, represent the two new faces to be added upon insertion of vertex 4 into the mesh, and the two faces to be removed upon deletion of face 4 from the mesh. Face record 3, as shown in FIG. 4, includes face attribute data for the face 3, identified as the face to be updated in the face update record at 311 in FIG. 3. Attribute A of face 3 is to be changed as is indicated in the face update record at 312, and the vertex value data at 313 and 314 indicate that the attribute is to be changed to vertex 1 if resolution is decreasing or vertex 4 if resolution is increasing. Because this example involves increasing resolution, attribute A as shown at 401 in FIG. 4 is changed from its previous value of 1 to the new value of 4, indicating that attribute A of face 3 is now vertex 4. Therefore, referring again to FIG. 2, face 3 shown at 202 now has vertices 4, 2, and 3 rather than vertices 1, 2, and 3 as it did before the update.

The face update record at 303 indicates how many faces will be updated, and therefore how many face update records will be associated with the vertex record. The new faces record at 302 indicates that two new faces are to be added to complete the new higher resolution mesh, which requires finding information relating to the new faces to be added.

As FIG. 5 shows, the vertex array has a pointer Vptr shown at 501, and the face array has a face pointer Fptr shown at 503, each of which identify a specific record in the arrays. These pointers point to V3 in the vertex array and F3 in the face array respectively, and indicate that at the present resolution data should only be provided to the rendering pipeline up to and including V3 and F3. Such rendering data will produce the initial four-sided four vertex mesh of this example shown in FIG. 1.

When a vertex is added, the pointer Vptr is moved down to the next vertex, shown at 502. Because Vptr now points to vertex 4, the vertex update record associated with vertex 4 is processed to update the mesh. Similarly, when a vertex is removed, the pointer Vptr is moved up to the previous vertex, such as from 502 to 501, and the vertex update record is processed to update the mesh.

The vertex update record for vertex 4 indicates at 302 that two faces are to be added when vertex 4 is added, and so the face array pointer Fptr is incremented two records from its position at 503 where it points to the face 3 attribute record to 504 where it points to the face 5 attribute record. The number of faces provided to the rendering pipeline has therefore increased by two, to include face records 4 and 5.

The vertex update record also indicates in the face updates record at 303 that one face update is to be performed, as we have already seen, to modify the attributes of face record 3 shown in FIG. 4. By modifying the attributes of face record 3 as indicated by face record F3 at 505 in the face array of FIG. 5, an updated face record reflecting the new attributes of face 3 will be provided to the rendering pipeline when the data from the face array and vertex array is sent to be rendered. And, because information in the vertex and face arrays are listed in order of increasing resolution, information can be provided directly to the rendering pipeline from the arrays with no further sorting or other processing.

The vertex update record as described herein is one embodiment of the present invention, which may be implemented by any other structure that has the function of creating ordered multi-resolution vertex and face arrays, consistent with the scope of the claims. Although the example here illustrates a single vertex update record, a vertex update record is associated with each vertex that may be added to or removed from a mesh in a typical embodiment of the invention. Other embodiments need not specifically comprise a data structure that contains all the elements of the exemplary data structure previously discussed, and it is specifically contemplated that other embodiments exist which are within the scope of this invention.

The invention may also be implemented with meshes other than the triangle mesh described in the exemplary embodiment herein. Meshes of polygons with more than three vertices fall within the scope of the invention, which may be easily adapted by the addition of vertices to the faces stored in the face array and elsewhere as necessary. Such embodiments may require addition of multiple vertices in a single update to completely define a new or updated face, and so a vertex update record for meshes of non-triangular polygons may include additional data indicating grouping of ordered vertices to be added or deleted together.

The invention may be implemented in hardware, such as in an application-specific video processing integrated circuit, or in software, such as an application running on the processor of a general-purpose computer. It is anticipated that practiced embodiments of the invention will include both hardware and software embodiments, and combinations of hardware and software. For example, current hardware rendering pipelines are capable of processing vertex and face arrays, but cannot process a vertex update record such as in the example embodiment discussed above. Therefore, software running on a general-purpose processor or an equivalent must pre-process the vertex and face arrays using the vertex update records before the arrays are provided to the rendering pipeline.

It is anticipated that future hardware will incorporate a module operable to process a vertex update record or to store an entire mesh, and so the vertex update records may be processed by application-specific hardware. In systems that lack three-dimensional mesh rendering hardware, the rendering itself may be performed in software on a general-purpose processor such that the invention is practiced by software running on the processor.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

We claim:

1. A method of incrementally varying a resolution of a multi-resolution mesh with a plurality of vertices and faces, comprising:

adding a vertex to an original mesh if the resolution of the multi-resolution mesh is increasing;

deleting a vertex from the original mesh if the resolution of the multi-resolution mesh is decreasing;

wherein adding or removing a vertex from the original mesh comprises incrementally moving a pointer from referring to an original vertex record of a pre-ordered vertex array to referring to a new vertex record of the pre-ordered vertex array corresponding to a new incremental resolution;

updating one or more faces of the original mesh if needed;

adding one or more faces to the original mesh if needed when a vertex is added to the original mesh; and deleting one or more faces from the original mesh if needed when a vertex is deleted from the original mesh;

wherein updating one or more faces of the original mesh if needed comprises processing a face update record for each face to be updated, processing a face update record comprising:

reading a face number indicating a face to be updated;

reading a face vertex attribute record from the face update record that indicates which face vertex attribute of the face to be updated will have its value changed; and changing the face vertex attribute to a decreasing resolution value when a vertex is deleted.

2. The method of claim 1, wherein moving a pointer from referring to an original vertex array record to referring to a new vertex record of the pre-ordered vertex array comprises incrementing a vertex record number referenced by the pointer to incrementally increase a mesh resolution.

3. The method of claim 1, wherein deleting a vertex from an original mesh comprises moving a pointer from referring to an original vertex record of an ordered vertex array to referring to a new vertex record of the pre-ordered vertex array corresponding to a new incremental resolution.

4. The method of claim 3, wherein moving a pointer from referring to an original vertex array record to referring to a new vertex record of the pre-ordered vertex array comprises decrementing a vertex record number referenced by the pointer to incrementally decrease the mesh resolution.

5. The method of claim 1, wherein updating one or more faces of the original mesh if needed comprises changing a face vertex attribute of a face record in a face array to a specified vertex record number.

6. The method of claim 1, wherein adding one or more faces to the original mesh if needed comprises moving a pointer from referring to an original face record of a pre-ordered face array to referring to a new face record of the ordered face array that corresponds to a new incrementally higher resolution if one or more faces need to be added.

7. The method of claim 6, wherein the number of faces added is indicated by an increasing resolution value of a face update record.

8. The method of claim 1, wherein deleting one or more faces from the original mesh if needed comprises moving a pointer from referring to an original face record of a pre-ordered face array to referring to a new face record of the ordered face array that corresponds to a new incrementally lower resolution if one or more faces need to be deleted.

9. The method of claim 8, wherein the number of faces deleted is indicated by a decreasing resolution value of a face update record.

10. A machine-readable medium with instructions thereon, the instructions operable to incrementally vary a resolution of a multi-resolution mesh by causing a computer to:

add a vertex to an original mesh if the resolution of the multi-resolution mesh is increasing;

delete a vertex from the original mesh if the resolution of the multi-resolution mesh is decreasing;

wherein adding or removing a vertex from the original mesh comprises incrementally moving a pointer from referring to an original vertex record of a pre-ordered vertex array to referring to a new vertex record of the ordered vertex array corresponding to a new incremental resolution;

update one or more faces of the original mesh if needed;

add one or more faces to the original mesh if needed when a vertex is added to the original mesh; and delete one or more faces from the original mesh if needed when a vertex is deleted from the original mesh, wherein updating one or more faces of the original mesh if needed comprises processing a face update record for each face to be updated, processing a face update record comprising:

reading a face number indicating a face to be updated;

reading a face vertex attribute record from the face update record that indicates which face vertex attribute of the face to be updated will have its value changed; and changing the face vertex attribute to a decreasing resolution value when a vertex is deleted.

11. The machine-readable medium of claim 10, wherein the instructions operable to cause a computer to add one or more faces to the original mesh if needed comprise moving a pointer from referring to an original face record of a pre-ordered face array to referring to a new face record of the ordered face array that corresponds to a new incrementally higher resolution if one or more faces need to be added.

12. The machine-readable medium of claim 10, wherein the instructions operable to cause a computer to delete one or more faces from the original mesh if needed comprise moving a pointer from referring to an original face record of a pre-ordered face array to referring to a new face record of the ordered face array that corresponds to a new incrementally lower resolution if one or more faces need to be deleted.

13. A method of incrementally varying a resolution of a multi-resolution mesh with a plurality of vertices and faces, comprising:

adding a vertex to an original mesh by incrementally moving a pointer in a pre-ordered vertex array if the resolution of the multi-resolution mesh is increasing;

deleting a vertex from the original mesh by incrementally moving the pointer in the pre-ordered vertex array if the resolution of the multi-resolution mesh is decreasing;

updating one or more faces of the original mesh if needed by changing a face vertex attribute of each face to be updated;

adding one or more faces to the original mesh if needed when a vertex is added to the original mesh by moving a pointer to a new face record corresponding to an incrementally higher resolution within a pre-ordered face array; and deleting one or more faces from the original mesh if needed when a vertex is deleted from the original mesh by moving a pointer to a new face record corresponding to an incrementally lower resolution within the pre-ordered face array wherein updating one or more faces of the original mesh if needed comprises processing a face update record for each face to be updated, processing a face update record comprising:

reading a face number indicating a face to be updated;

reading a face vertex attribute record from the face update record that indicates which face vertex attribute of the face to be updated will have its value changed; and changing the face vertex attribute to a decreasing resolution value when a vertex is deleted.

14. A system, comprising:

a pre-ordered vertex array containing vertex records defining a multi-resolution mesh in order of increasing resolution;

a pre-ordered face array containing face records defining a multi-resolution mesh in order of increasing resolution;

a vertex update record containing face and vertex update information such that the update information is applied to the multi-resolution mesh to incrementally vary the resolution of the mesh, the face update information comprising a face update record usable to update one or more faces of the original mesh if needed via a process comprising:
  reading a face number indicating a face to be updated;
  reading a face vertex attribute record from the face update record that indicates which face vertex attribute of the face to be updated will have its value changed; and
  changing the face vertex attribute to a decreasing resolution value when a vertex is deleted.

15. A machine-readable medium with a data structure stored thereon, the data structure comprising:
  a pre-ordered vertex array containing vertex records defining a multi-resolution mesh in order of increasing resolution;
  a pre-ordered face array containing face records defining a multi-resolution mesh in order of increasing resolution;
  a vertex update record containing face and vertex update information such that the update information is applied to the multi-resolution mesh to incrementally vary the resolution of the mesh, the face update information comprising a face update record usable to update one or more faces of the original mesh if needed via a process comprising:
    reading a face number indicating a face to be updated;
    reading a face vertex attribute record from the face update record that indicates which face vertex attribute of the face to be updated will have its value changed; and
    changing the face vertex attribute to a decreasing resolution value when a vertex is deleted.

16. A method of incrementally varying a resolution of a multi-resolution mesh with a plurality of vertices and faces, comprising:
  adding a vertex to an original mesh if the resolution of the multi-resolution mesh is increasing, wherein adding a vertex to the original mesh comprises incrementally moving a pointer from referring to an original vertex record of a pre-ordered vertex array to referring to a new vertex record of the pre-ordered vertex array corresponding to a higher incremental resolution;
  updating one or more faces of the original mesh if needed; and
  adding one or more faces to the original mesh if needed;
  wherein updating one or more faces of the original mesh if needed comprises processing a face update record for each face to be updated, processing a face update record comprising:
    reading a face number indicating a face to be updated; and
    reading a face vertex attribute record from the face update record that indicates which face vertex attribute of the face to be updated will have its value changed.

17. A method of incrementally varying a resolution of a multi-resolution mesh with a plurality of vertices and faces, comprising:
  deleting a vertex from the original mesh if the resolution of the multi-resolution mesh is decreasing, wherein deleting a vertex from the original mesh comprises incrementally moving a pointer from referring to an original vertex record of a pre-ordered vertex array to referring to a new vertex record of the pre-ordered vertex array corresponding to a lower incremental resolution;
  updating one or more faces of the original mesh if needed; and
  deleting one or more faces from the original mesh if needed;
  wherein updating one or more faces of the original mesh if needed comprises processing a face update record for each face to be updated, processing a face update record comprising:
    reading a face number indicating a face to be updated;
    reading a face vertex attribute record from the face update record that indicates which face vertex attribute of the face to be updated will have its value changed; and
    changing the face vertex attribute to a decreasing resolution value when a vertex is deleted.

* * * * *